(12) United States Patent
He

(10) Patent No.: US 11,966,067 B2
(45) Date of Patent: Apr. 23, 2024

(54) DISPLAY PANEL AND MANUFACTURING METHOD THEREFOR

(71) Applicant: HKC CORPORATION LIMITED, Shenzhen (CN)

(72) Inventor: Huailiang He, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/946,049

(22) Filed: Sep. 16, 2022

(65) Prior Publication Data

US 2023/0018660 A1 Jan. 19, 2023

Related U.S. Application Data

(62) Division of application No. 16/331,983, filed on Mar. 11, 2019, now Pat. No. 11,480,718.

(51) Int. Cl.
*G02B 5/20* (2006.01)
(52) U.S. Cl.
CPC .................... *G02B 5/201* (2013.01)
(58) Field of Classification Search
CPC .......... G02B 5/201; G02B 5/20; G02B 5/223; G09F 9/30

USPC ........................................................ 359/891
See application file for complete search history.

(56) References Cited

U.S. PATENT DOCUMENTS

| 7,212,262 | B2 * | 5/2007 | Kang ................. G02F 1/133514 |
| | | | 349/110 |
| 9,900,590 | B2 * | 2/2018 | Wang .................... H04N 13/356 |
| 2014/0191213 | A1 * | 7/2014 | Sawada .................. G02B 5/223 |
| | | | 252/586 |
| 2016/0266287 | A1 * | 9/2016 | Cheng ..................... G02B 5/201 |
| 2016/0342018 | A1 * | 11/2016 | Xue ....................... G03F 7/0007 |
| 2018/0188597 | A1 * | 7/2018 | Jiang .................... G02F 1/13394 |

* cited by examiner

*Primary Examiner* — Jade R Chwasz

(57) ABSTRACT

A display panel and a manufacturing method therefor are disclosed. The display panel includes a plurality of pixels and corresponding filters. A planarization layer is arranged on the filters. The planarization layer and a transparent filter are made of the same transparent photoresist material. The manufacturing method includes: preparing a filter; and forming a planarization layer on the filter, where preparing a filter includes forming a transparent filter, where the same transparent photoresist material is used in the operation of forming the transparent filter and in the operation of forming the planarization layer on the filter.

4 Claims, 5 Drawing Sheets

DISPLAY PANEL AND MANUFACTURING METHOD THEREFOR

CROSS REFERENCE OF RELATED APPLICATIONS

This application is a Divisional of U.S. patent application Ser. No. 16/331,983 filed on Mar. 11, 2019. This application claims priority to Chinese Patent Application No. 201811167007.7, filed with the Chinese Patent Office on Oct. 8, 2018 and entitled "DISPLAY PANEL AND MANUFACTURING METHOD THEREFOR", which is incorporated herein by reference in its entirety.

TECHNICAL FIELD

This application relates to the field of display technologies, and more specifically to a display panel and manufacturing method therefor.

BACKGROUND

The description herein provides only background information related to this application, but does not necessarily constitute the existing technology.

With the development of technologies, displays featuring such advantages as thinness, power saving, and no radiation have been widely applied. Most displays on the market are backlight displays. The backlight display includes a display panel and a backlight module. The display panel includes a color filter (CF) substrate and a thin film transistor (TFT) substrate. There are transparent electrodes on opposite inner sides of the substrate.

As displays are developing toward high resolution, 4K Ultra-High Definition (UHD) televisions have been gaining popularity. With the continuous increase in the display size, users require increasingly high resolution. The effective method of improving the panel resolution is to increase the number of pixels on the screen while reducing the size of pixels. Generally, there is a great demand of high transmittance panels. One reason is that the power consumption requirement can be lowered by changing some designs in displays. Another reason is that higher transmittance indicates a more vivid image and higher image quality. However, the resolution and transmittance of existing display panels are not high enough to meet people's increasing requirements.

SUMMARY

An objective of this application is to provide a display panel and manufacturing method therefor, to improve the resolution and transmittance of the display panel.

To achieve the above objectives, this application provides a display panel manufacturing method, comprising the following steps: preparing a filter; and forming a planarization layer on the filter, wherein the step of preparing a filter comprises a step of forming a transparent filter, wherein the same transparent photoresist material is used in the step of forming a transparent filter and the step of forming a planarization layer on the filter.

Optionally, the step of preparing a filter and the step of forming a planarization layer on the filter are performed on an array substrate by using a color filter on array technology.

The step of preparing a filter and the step of forming a planarization layer on the filter are performed on a color filter substrate opposite to an array substrate by using a color filter on array technology.

Optionally, the step of forming a transparent filter comprises: forming a transparent photoresist layer by using the transparent photoresist material; and exposing and developing the transparent photoresist layer by using a mask, to obtain the transparent filter.

Optionally, the step of exposing and developing the transparent photoresist layer by using a mask comprises baking the exposed and developed transparent photoresist layer.

Optionally, the step of forming a planarization layer on the filter comprises: coating a transparent photoresist layer by using the same material as that of the transparent filter; and baking the transparent photoresist layer to form the planarization layer.

Optionally, the step of preparing a filter comprises forming a color filter.

Optionally, the step of forming a color filter comprises: coating a color photoresist layer by using a color photoresist material; exposing the color photoresist layer by using a mask; and developing the color photoresist layer by using a developer, to obtain the color filter pattern; and performing baking to form a color filter.

Optionally, after the step of forming a color filter, a planarization layer is formed on the color filter.

Optionally, the step of forming the planarization layer on the color filter comprises: coating a transparent photoresist layer by using the transparent photoresist material; and baking the transparent photoresist layer to form the planarization layer.

This application further discloses a display panel manufacturing method, comprising the following steps: a step of forming a filter, the step of forming a filter comprising: a step of forming a first color filter, a step of forming a second color filter, a step of forming a third color filter, and a step of forming a transparent filter, the step of forming a transparent filter comprising: coating a transparent photoresist layer by using a transparent photoresist material, exposing the transparent photoresist layer by using a mask, developing the transparent photoresist layer by using a developer, to obtain a transparent filter pattern, and performing baking to form the transparent filter; and after the step of forming a filter, forming a planarization layer on the color filter and the transparent filter, comprising the following steps: coating a transparent photoresist layer by using the transparent photoresist material, and baking the transparent photoresist layer to form the planarization layer.

This application further discloses a display panel, comprising: a plurality of pixels, each comprising a plurality of sub-pixels; and a plurality of filters corresponding one-to-one to the pixels, wherein each of the filters comprises a plurality of sub-filters, the sub-filters correspond one-to-one to the sub-pixels in the corresponding pixel, and each of the filters comprises a plurality of color sub-filters and at least one the transparent filter; and the display panel further comprising a planarization layer arranged above the filter, wherein the planarization layer and the transparent filter are made of the same transparent photoresist material, and the transparent filter and the planarization layer are prepared by using two exposure and development processes.

Optionally, a development boundary layer is formed between contact surfaces of the transparent filter and the planarization layer.

Optionally, residual developer exists in the development boundary layer formed between the contact surfaces of the transparent filter and the planarization layer.

Optionally, an average value of a total thickness of all films at the transparent filter is the same as an average value of a total thickness of all films at the color filter.

Optionally, each of the filters comprises a red sub-filter, a green sub-filter, a blue sub-filter, and a transparent filter, each of the pixels comprises a red sub-pixel corresponding to the red sub-filter, a green sub-pixel corresponding to the green sub-filter, a blue sub-pixel corresponding to the blue sub-filter, and a white sub-pixel corresponding to the transparent filter, and the sub-pixels in each of the pixels are arranged in a row in the following order: the red sub-pixel, the green sub-pixel, the blue sub-pixel, and the white sub-pixel.

Optionally, each of the filters comprises a red sub-filter, a green sub-filter, a blue sub-filter, and a transparent filter; each of the pixels comprises a red sub-pixel corresponding to the red sub-filter, a green sub-pixel corresponding to the green sub-filter, a blue sub-pixel corresponding to the blue sub-filter, and a white sub-pixel corresponding to the transparent filter; and the sub-pixels in each of the pixels are arranged in a 2×2 configuration, wherein the red sub-pixel and the green sub-pixel are sequentially arranged in a first row, and the blue sub-pixel and the white sub-pixel are sequentially arranged in a second row.

In the display panel manufacturing process of this application, the material for preparing the transparent filter in the filter and the material for forming the planarization layer are the same, and both are a transparent photoresist material. Because the transparent filter and the planarization layer are formed by using the same material respectively in the step of preparing the filter and the step of forming the planarization layer on the filter, such a design allows the thickness of the transparent filter to be adjusted as required, so that the height at the transparent filter is close to the height at other positions on the filter, making the planarization layer formed on the filter more flat and even.

BRIEF DESCRIPTION OF DRAWINGS

The accompanying drawings included are used for helping understand the embodiments of this application, constitute a part of this specification, illustrate examples of the embodiments of this application and, together with the description, serve to explain the principles of this application. Apparently, the accompanying drawings in the following description merely show some embodiments of this application, and persons of ordinary skill in the art may still derive other drawings from these accompanying drawings without creative effort. In the figures.

DETAILED DESCRIPTION

Figure 1:
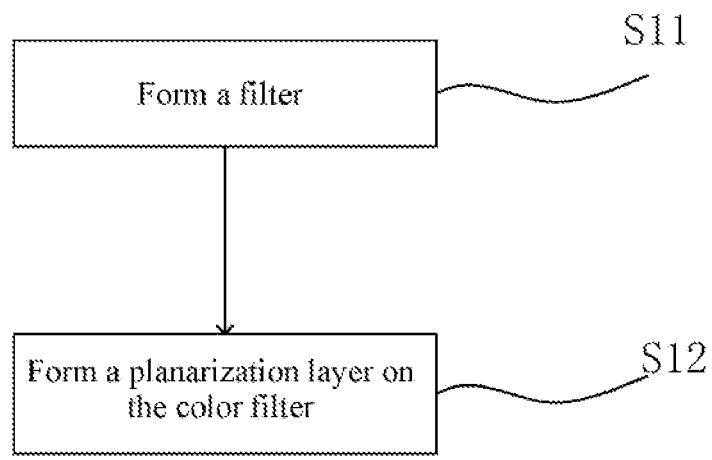
FIG. 1 is a schematic flowchart of a display panel manufacturing method according to an embodiment of this application.
Figure 2:
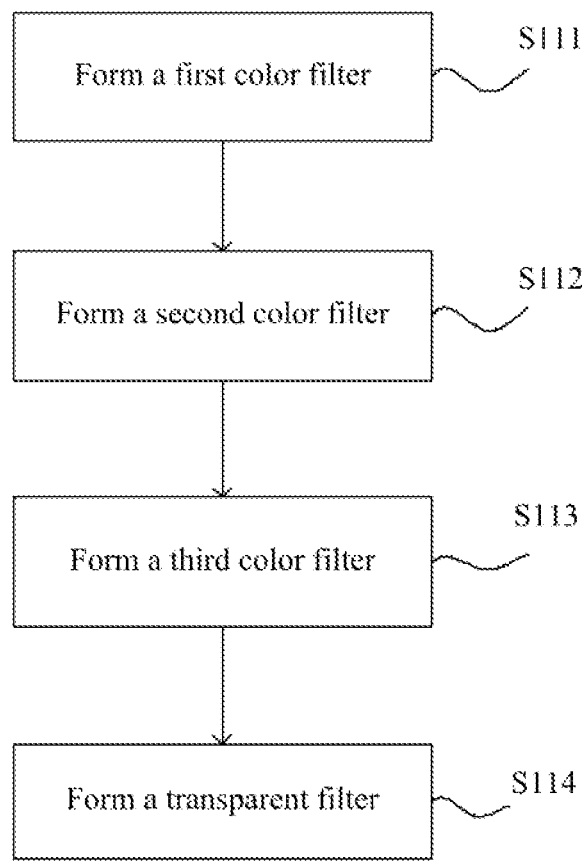
FIG. 2 is a schematic flowchart of a display panel manufacturing method according to another embodiment of this application.
Figure 3:
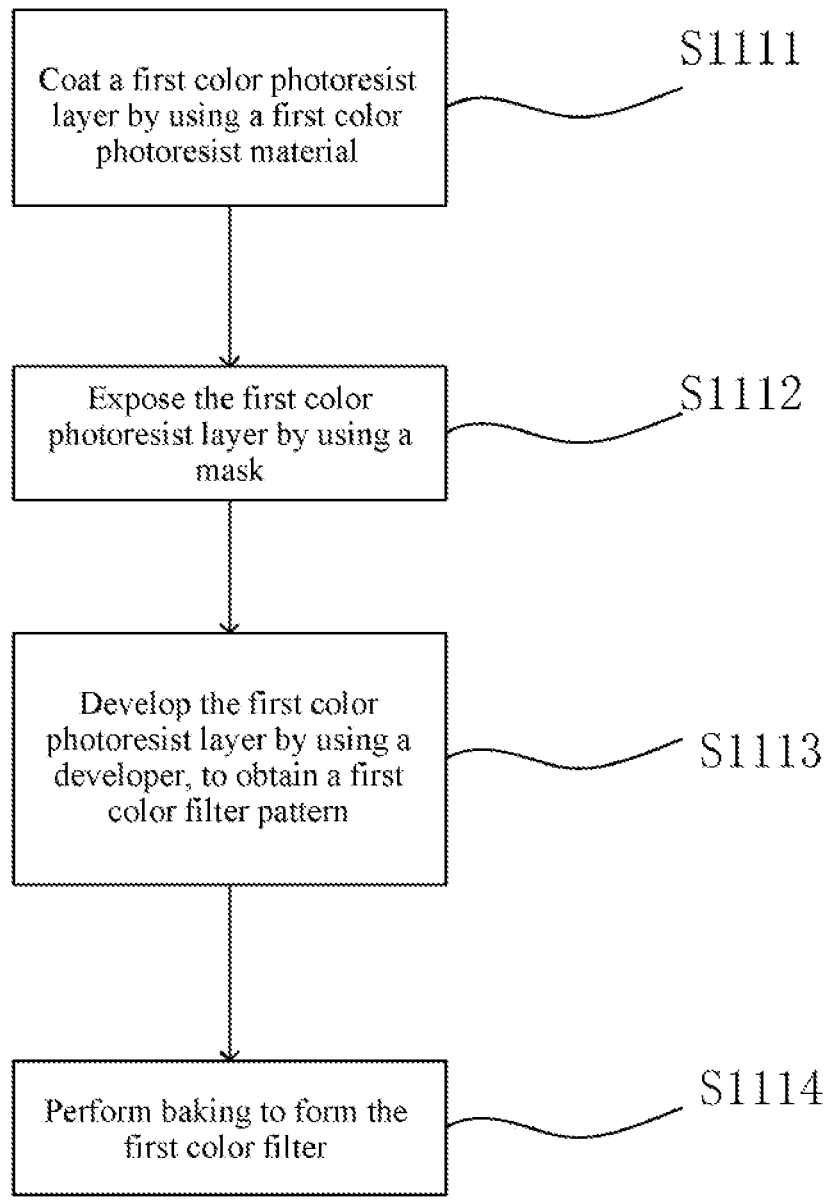
FIG. 3 is a schematic flowchart of a display panel manufacturing method according to another embodiment of this application.
Figure 4:
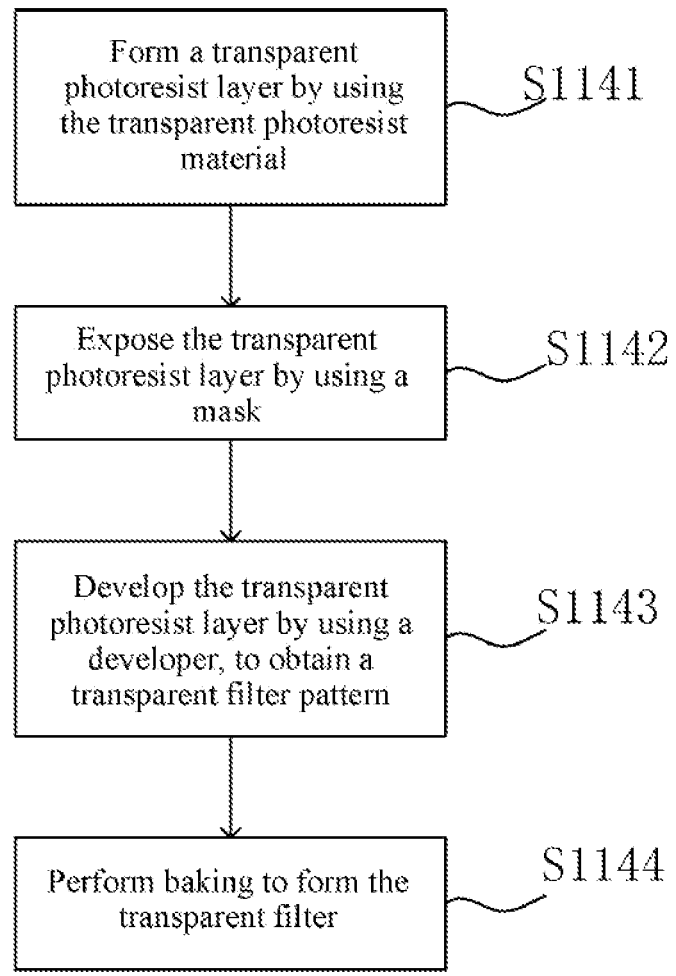
FIG. 4 is a schematic flowchart of a display panel manufacturing method according to another embodiment of this application.
Figure 5:
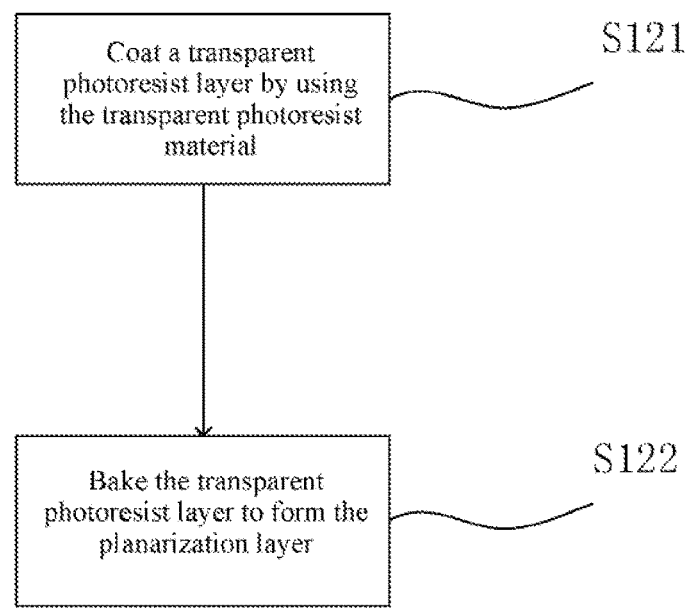
FIG. 5 is a schematic flowchart of a display panel manufacturing method according to another embodiment of this application.

Specific structures and functional details disclosed herein are merely representative, and are intended to describe the objectives of the exemplary embodiments of this application. However, this application may be specifically implemented in many alternative forms, and should not be construed as being limited to the embodiments set forth herein.

In the description of this application, it should be understood that orientation or position relationships indicated by the terms such as "center", "transverse", "on", "below", "left", "right", "vertical", "horizontal", "top", "bottom", "inside", and "outside" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of this application. In addition, the terms such as "first" and "second" are used only for the purpose of description, and should not be understood as indicating or implying the relative importance or implicitly specifying the number of the indicated technical features. Therefore, a feature defined by "first" or "second" can explicitly or implicitly include one or more of said features. In the description of this application, unless otherwise stated, "a plurality of" means two or more than two. In addition, the terms "include", "comprise" and any variant thereof are intended to cover non-exclusive inclusion.

In the description of this application, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. Persons of ordinary skill in the art may understand the specific meanings of the foregoing terms in this application according to specific situations.

The terminology used herein is for the purpose of describing specific embodiments only and is not intended to be limiting of exemplary embodiments. As used herein, the singular forms "a", "an" and "the" are intended to include the plural forms as well, unless the context clearly indicates otherwise. It should be further understood that the terms "include" and/or "comprise" when used in this specification, specify the presence of stated features, integers, steps, operations, elements, and/or components, but do not preclude the presence or addition of one or more other features, integers, steps, operations, elements, components, and/or combinations thereof.

This application is further described below with reference to the accompanying drawings and optional embodiments.

Referring to FIG. 1 to FIG. 5, embodiments of this application disclose a display panel manufacturing method, including the following steps: S11: preparing a filter, including a step of forming a transparent filter; and S12: forming a planarization layer on the filter.

The same transparent photoresist material is used in the step of forming a transparent filter in S11 and the step S12 of forming a planarization layer on the filter.

The display panel manufacturing process includes steps of preparing a filter and forming a planarization layer on the filter. The step of preparing a filter includes forming a transparent filter. The material used for forming the transparent filter is a transparent photoresist material, which is the same as the material used for forming the planarization layer on the filter. The transparent filter has the same thickness as other filters, making the planarization layer formed on the filter more flat and even.

In an embodiment, the step of preparing a filter and the step of forming a planarization layer on the filter are performed on an array substrate by using a color filter on array technology.

In an embodiment, the step of preparing a filter and the step of forming a planarization layer on the filter are performed on a color filter substrate opposite to an array substrate by using a color filter on array technology.

The steps S11 and S12 may be performed on an array substrate or a color filter substrate opposite to an array substrate by using a color filter on array technology. In the entire display panel manufacturing method, persons skilled in the art can flexibly design the order of other structure processes such as thin film transistor (TFT)-related processes as required.

In an embodiment, the step S114 of forming a transparent filter includes: S1141. forming a transparent photoresist layer by using the transparent photoresist material; and S1142. exposing the transparent photoresist layer by using a mask.

This is a specific method of forming a transparent photoresist layer by using a photoresist material. The formed transparent photoresist layer is exposed and developed. This requires an additional mask process compared with a red/green/blue filter.

In an embodiment, the step of exposing and developing the transparent photoresist layer by using a mask includes baking the exposed and developed transparent photoresist layer.

After being exposed and developed, the transparent photoresist layer needs to be baked, to obtain the transparent filter.

In an embodiment, the step S12 of forming a planarization layer on the filter includes: S121: coating a transparent photoresist layer by using the same material as that of the transparent filter; and S122: baking the transparent photoresist layer to form the planarization layer.

The transparent photoresist material is used for forming the transparent filter. In the process of forming the planarization layer on the filter, the same material is coated on the filter, and the transparent photoresist layer is baked to form the planarization layer. Because the same transparent photoresist material is used, a more flat and even planarization layer is formed.

In an embodiment, the step of preparing a filter includes forming a color filter.

When the filter is prepared, the color filter is also prepared. After all the filters are prepared, a next procedure is carried out.

In an embodiment, the step of forming a color filter includes: coating a color photoresist layer by using a color photoresist material; exposing the color photoresist layer by using a mask; and developing the color photoresist layer by using a developer, to obtain the color filter pattern; and performing baking to form a color filter.

In a specific process of forming the color filter, a color photoresist material needs to be coated on the color photoresist layer first, and then exposed and developed to obtain a color filter pattern, and finally the filter is baked to obtain the color filter.

In an embodiment, after the step of forming a color filter, a planarization layer is formed on the color filter.

After the color filter is formed, a planarization layer needs to be formed on the color filter.

In an embodiment, the step of forming the planarization layer on the color filter includes: coating a transparent photoresist layer by using the transparent photoresist material; and baking the transparent photoresist layer to form the planarization layer.

In a specific process of forming the planarization layer, first, a transparent photoresist layer material is coated, and the transparent photoresist layer is baked again to form the planarization layer.

Referring to FIG. 1 to FIG. 5, the embodiments of this application further disclose a display panel manufacturing method, including the following steps: S11: a step of forming a filter, including: S11: a step of forming a first color filter, the step of forming a first color filter including: S1111: coating a first color photoresist layer by using a first color photoresist material, S1112: exposing the first color photoresist layer by using a mask, S1113: developing the first color photoresist layer by using a developer, to obtain a first color filter pattern, and S1114: performing baking to form the first color filter, S112: a step of forming a second color filter, specific steps of this step being similar to those of the step of forming the first color filter, S113: a step of forming a third color filter, specific steps of this step being similar to those of the step of forming the first color filter, and S114: a step of forming a transparent filter, the step of forming a transparent filter including: S1141: coating a transparent photoresist layer by using a transparent photoresist material, S1142: exposing the transparent photoresist layer by using a mask, S1143: developing the transparent photoresist layer by using a developer, to obtain a transparent filter pattern, and S1144: performing baking to form the transparent filter; and after the step of forming a filter, forming a planarization layer on the color filter and the transparent filter, including the following steps: S121: coating a transparent photoresist layer by using the transparent photoresist material, and S122: baking the transparent photoresist layer to form the planarization layer.

The same transparent photoresist material is used in the step S114 of forming a transparent filter and the step S121 of coating a transparent photoresist layer by using the transparent photoresist material.

In the above manufacturing method, there is no particular order between the step of forming the first/second/third color filter and the step of forming a transparent filter. The display panel manufacturing process includes steps of preparing a filter and forming a planarization layer on the filter. The step of preparing a filter includes forming a transparent filter. The material used for forming the transparent filter is a transparent photoresist material, which is the same as the material used for forming the planarization layer on the filter. The transparent filter has the same thickness as other filters, making the planarization layer formed on the filter more flat and even. when a transparent photoresist layer is formed by using the photoresist material, the formed transparent photoresist layer is exposed and developed to obtain the transparent filter. This requires an additional mask process compared with a red/green/blue filter. The transparent photoresist material is used for forming the transparent filter. In the process of forming the planarization layer on the filter, the same material is coated on the filter, and the transparent photoresist layer is baked to form the planarization layer. Because the same transparent photoresist material is used, a more flat and even planarization layer is formed.

Figure 6:
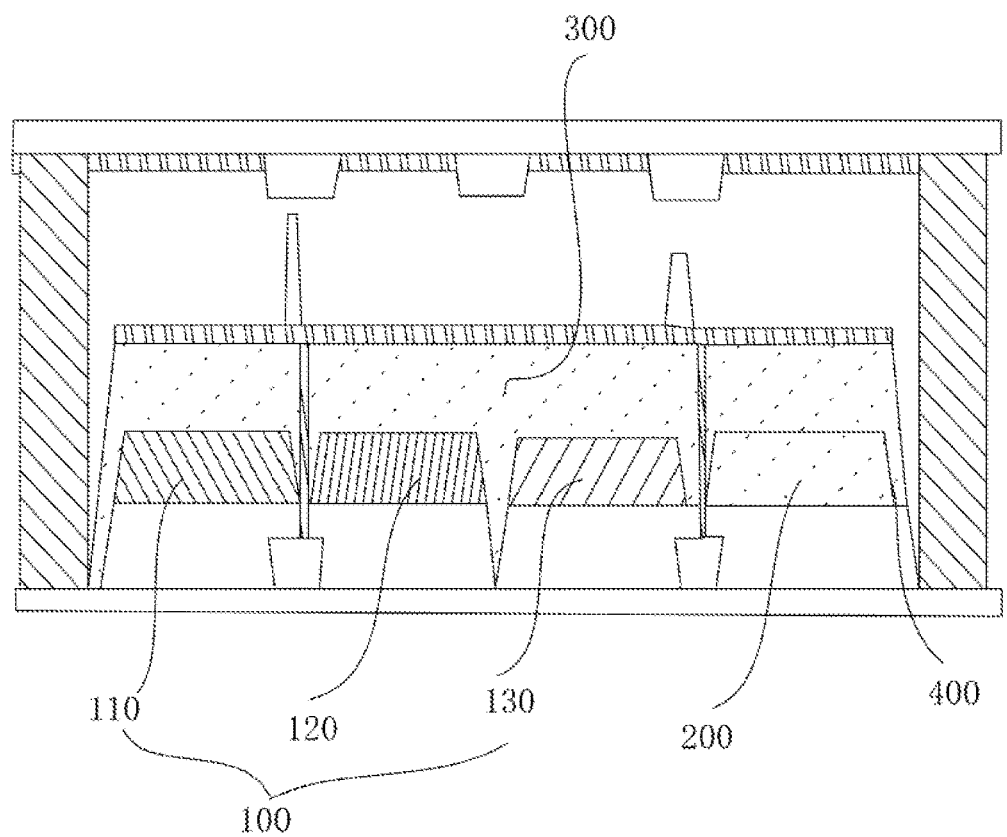
FIG. 6 is a schematic cross-sectional view of a display panel according to another embodiment of this application.
Figure 7:
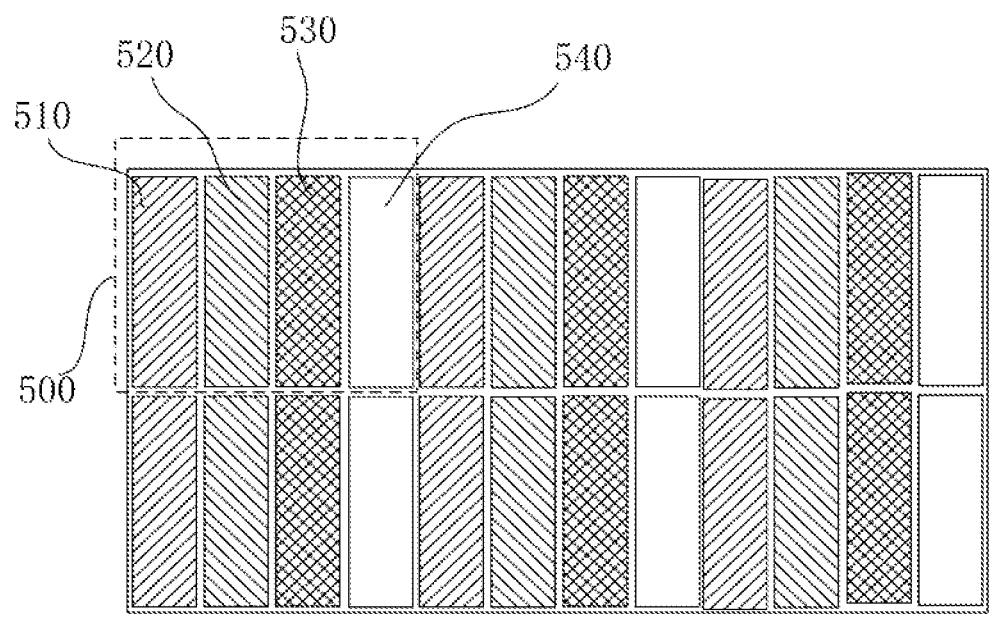
FIG. 7 is a schematic diagram of sub-pixels arranged in a row according to another embodiment of this application.
Figure 8:
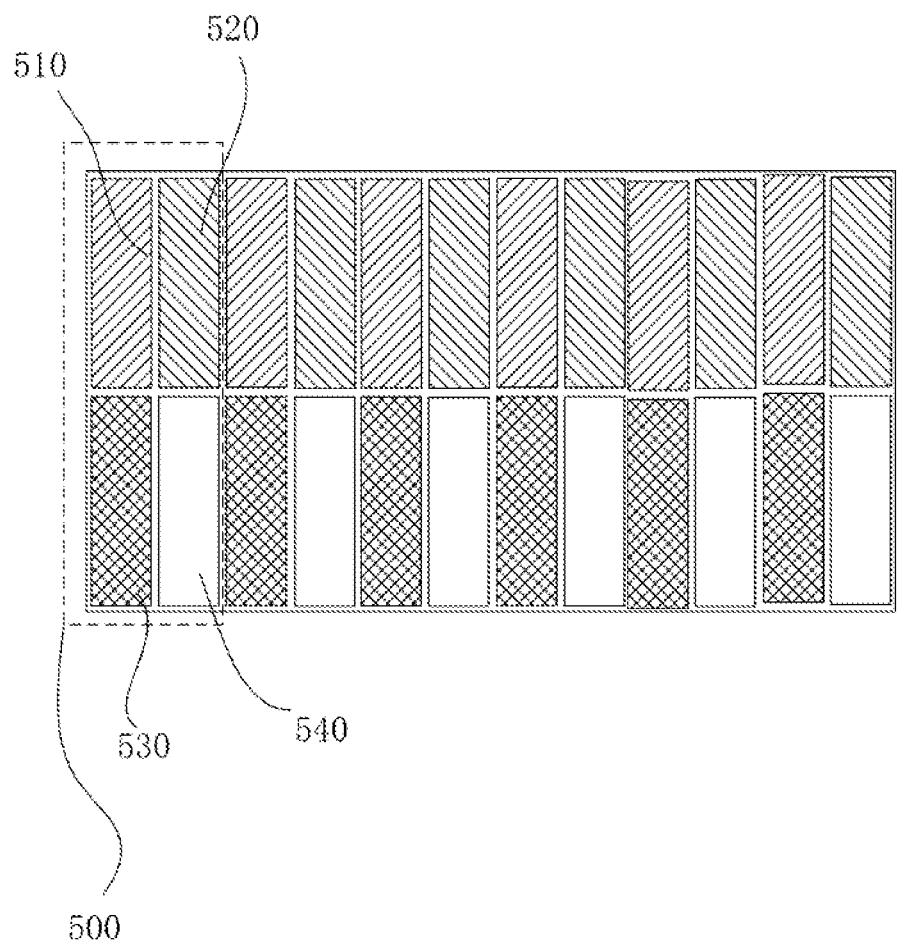
FIG. 8 is a schematic diagram of sub-pixels arranged in a 2×2 configuration according to another embodiment of this application.

Referring to FIG. 6 to FIG. 8, the embodiments of this application further disclose a display panel, including: a plurality of pixels, each including a plurality of sub-pixels; and a plurality of filters corresponding one-to-one to the pixels, wherein each of the filters includes a plurality of sub-filters, the sub-filters correspond one-to-one to the sub-pixels in the corresponding pixel, and each of the filters includes a plurality of color sub-filters 100 and at least one the transparent filter 200; and the display panel further including a planarization layer 300 arranged above the filter, wherein the planarization layer 300 and the transparent filter 200 are made of the same transparent photoresist material, and the transparent filter 200 and the planarization layer 300 are prepared by using two exposure and development processes.

The display panel includes a filter and a planarization layer 300 formed on the filter. The filter includes at least one transparent filter 200 and a plurality of color sub-filters 100. The material used for forming the transparent filter 200 is a transparent photoresist material, which is the same as the material used for forming the planarization layer 300 on the filter. The transparent filter 200 has the same thickness as other filters, making the planarization layer 300 formed on the filter more flat and even.

In an embodiment, a development boundary layer 400 is formed between contact surfaces of the transparent filter 200 and the planarization layer 300.

The specific method of forming a transparent photoresist layer by using a transparent photoresist material requires an additional mask process compared with a red/green/blue filter. After exposure and development, the transparent photoresist layer is formed. Coating is performed again to form the planarization layer 300. A development boundary layer 400 is formed between contact the surfaces of the transparent filter 200 and the planarization layer 300.

In an embodiment, residual developer exists in the development boundary layer 400 formed between contact the surfaces of the transparent filter 200 and the planarization layer 300.

A residual amount of the developer for development is left between the contact surfaces of the transparent filter 200 and the planarization layer 300. Residual developer exists in the development boundary layer 400.

In an embodiment, an average value of a total thickness of all films at the transparent filter 200 is the same as an average value of a total thickness of all films at the color filter 100.

The average value of the total thickness of all films in the transparent filter 200 is the same as the average value of the total thickness of all films in the color filter 100, thereby ensuring that the film thicknesses of the transparent filter 200 and the color filter 100 are the same, and making the planarization layer 300 more flat and even. Certainly, the thicknesses being the same refers to that the thicknesses are the same within a processing precision range. Thicknesses having a difference less than a processing precision threshold are considered as having the same value.

In an embodiment, each of the filters includes a red sub-filter 110, a green sub-filter 120, a blue sub-filter 130, and a transparent filter 200. Each of the pixels comprises a red sub-pixel 510 corresponding to the red sub-filter 110, a green sub-pixel 520 corresponding to the green sub-filter 120, a blue sub-pixel 530 corresponding to the blue sub-filter 130, and a white sub-pixel 540 corresponding to the transparent filter 200. The sub-pixels in each of the pixels are arranged in a row in the following order: the red sub-pixel 510, the green sub-pixel 520, the blue sub-pixel 530, and the white sub-pixel 540.

In a specific RGBW pixel architecture, each of the filters includes a red sub-filter 110, a green sub-filter 120, a blue sub-filter 130, and a transparent filter 200. The four types of filters respectively correspond to four types of sub-pixels. The four types of sub-pixels are arranged in a row in the following order: the red sub-pixel 510, the green sub-pixel 520, the blue sub-pixel 530, and the white sub-pixel 540. High transmittance and resolution can be achieved by using such an architecture.

In an embodiment, each of the filters includes a red sub-filter 110, a green sub-filter 120, a blue sub-filter 130, and a transparent filter 200. Each of the pixels comprises a red sub-pixel 510 corresponding to the red sub-filter 110, a green sub-pixel 520 corresponding to the green sub-filter 120, a blue sub-pixel 530 corresponding to the blue sub-filter 130, and a white sub-pixel 540 corresponding to the transparent filter 200. The sub-pixels in each of the pixels are arranged a 2×2 configuration. The red sub-pixel 510 and the green sub-pixel 520 are sequentially arranged in a first row, and the blue sub-pixel 530 and the white sub-pixel 540 are sequentially arranged in a second row.

In another specific RGBW pixel architecture, each of the filters includes a red sub-filter 110, a green sub-filter 120, a blue sub-filter 130, and a transparent filter 200. The four types of filters respectively correspond to four types of sub-pixels. The four types of sub-pixels are arranged in a 2×2 configuration. The red sub-pixel 510 and the green sub-pixel 520 are sequentially arranged in a first row, and the blue sub-pixel 530 and the white sub-pixel 540 are sequentially arranged in a second row. High transmittance and resolution can be achieved by using such an architecture.

It should be noted that the sequence numbers of steps involved in a specific solution should not be considered as limiting the order of steps as long as the implementation of this solution is not affected. The steps appearing earlier may be executed earlier than, later than, or at the same time as those appearing later. Such implementations shall all be considered as falling within the protection scope of this application as long as this solution can be implemented.

The display panel of this application may be a twisted nematic (TN) panel, an in-plane switching (IPS) panel, or a multi-domain vertical alignment (VA) panel, and may certainly be any other suitable type of panel.

The foregoing content is merely detailed descriptions of this application made with reference to specific optional implementations, and should not be considered limiting of specific implementations of this application. Persons of ordinary skill in the art can further make simple deductions or replacements without departing from the concept of this application, and such deductions or replacements should all be considered as falling within the protection scope of this application.

What is claimed is:

1. A display panel, comprising:
a plurality of pixels, each comprising a plurality of sub-pixels; and a plurality of filters corresponding one-to-one to the pixels, wherein each of the filters comprises a plurality of sub-filters, the sub-filters correspond one-to-one to the sub-pixels in the corresponding pixel, and each of the filters comprises a plurality of color sub-filters and at least one the transparent filter; and the display panel further comprising a planarization layer arranged above the filter, wherein the planarization layer and the transparent filter are made of the same transparent photoresist material, and the transparent filter and the planarization layer are prepared by using two exposure and development processes as two separate structures;

wherein a development boundary layer is formed between contact interfaces of the transparent filter and the planarization layer; wherein residual developer exists in the development boundary layer formed between the contact interfaces of the transparent filter and the planarization layer.

2. The display panel according to claim 1, wherein an average value of a total thickness of all films at the transparent filter is the same as an average value of a total thickness of all films at the color filter.

3. The display panel according to claim 1, wherein each of the filters comprises a red sub-filter, a green sub-filter, a blue sub-filter, and a transparent filter; each of the pixels comprises a red sub-pixel corresponding to the red sub-filter, a green sub-pixel corresponding to the green sub-filter, a blue sub-pixel corresponding to the blue sub-filter, and a white sub-pixel corresponding to the transparent filter; and the sub-pixels in each of the pixels are arranged in a row in the following order: the red sub-pixel, the green sub-pixel, the blue sub-pixel, and the white sub-pixel.

4. The display panel according to claim 1, wherein each of the filters comprises a red sub-filter, a green sub-filter, a blue sub-filter, and a transparent filter; each of the pixels comprises a red sub-pixel corresponding to the red sub-filter, a green sub-pixel corresponding to the green sub-filter, a blue sub-pixel corresponding to the blue sub-filter, and a white sub-pixel corresponding to the transparent filter; and the sub-pixels in each of the pixels are arranged in a 2×2 configuration, wherein the red sub-pixel and the green sub-pixel are sequentially arranged in a first row, and the blue sub-pixel and the white sub-pixel are sequentially arranged in a second row.

\* \* \* \* \*